United States Patent Office 2,796,526
Patented June 18, 1957

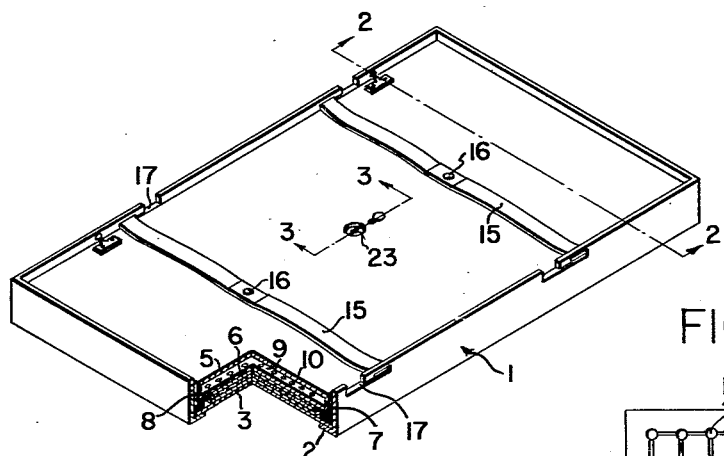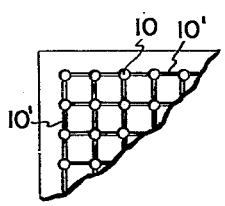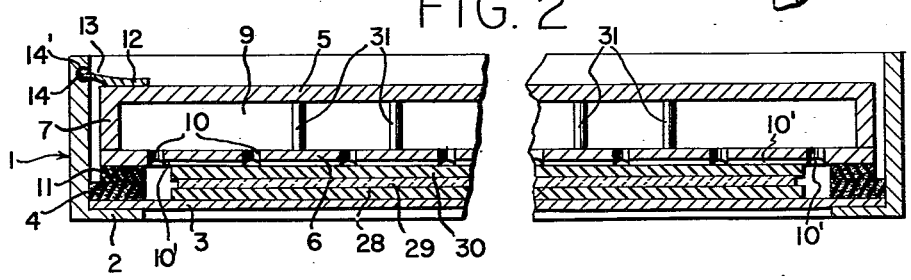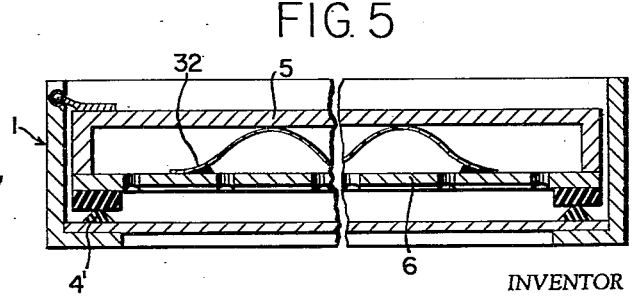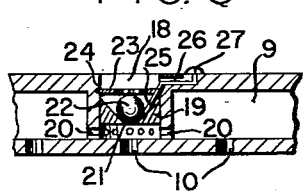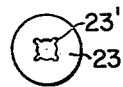

2,796,526
CASSETTES

Elmer Henry Lusebrink, Matawan, N. J., assignor to E. I. du Pont de Nemours and Company, Wilmington, Del., a corporation of Delaware Application February 4, 1954, Serial No. 408,194

9 Claims. (Cl. 250—68)

This invention relates to a cassette and more particularly to a vacuum-actuated cassette. Still more particularly it relates to a cassette for the exposure of X-ray films which has a cover provided with a vacuum chamber.

Various types of cassettes have been proposed for use in the art of photography as well as in the art of making radiographs or X-ray photographs. These cassettes differ widely in construction but some of them are quite complicated, expensive to build and heavy. The X-ray cassettes which find wide-spread use generally consist of a light-proof, shallow, tray-like box having a hinged or removable back which is impervious to X-rays. The front of the cassette is usually thin and made of metal or plastic material which is permeable to X-rays. These cassettes usually have a felt pad or lining on the inside of the removable back or cover and are provided with spring latches in order to provide firm contact between the sensitive film element and the adjacent X-ray intensifying screen or screens. The conventional cassettes should have certain inner minimum dimensions in order to receive the standard types of sensitive film and intensifying screens. Those used for commercial radiography have somewhat standard outer dimensions so that they will fit in the usual types of X-ray equipment, etc. They are quite heavy and have a rugged construction in order to withstand rough handling during use. Prior art cassettes which depend upon spring latches and felt pads to provide uniform contact between the sensitive film element and the X-ray screen have the disadvantage that as the hinges and felt pad wear or become compacted they lose their ability to provide uniform contact between the film and screen surfaces.

Cassettes have been made with pneumatic bags to provide contact between the film and screen surfaces but they have the disadvantage that they are susceptible to being ruptured due to improper handling and often tear loose and buckle, resulting in non-uniform contact. In addition, some pneumatic bags tend to leak with age.

An object of this invention is to provide a new type of cassette which will provide uniform contact between a photo-sensitive film element and an element which it is desired to maintain in uniform contact therewith. Another object is to provide such a cassette which provides uniform contact between the surfaces of an intensifying screen and a radiation-sensitive film element. A further object is to provide a simple and effective X-ray cassette which will provide uniform contact between the surfaces of an X-ray intensifying screen and an X-ray-sensitive film element for a period of at least 20 minutes. A still further object is to provide such a cassette which is light in weight and rugged in construction. Yet another object is to provide such a cassette which is simple in construction and easy to operate. Still other objects will be apparent from the following description of the invention.

The novel cassettes of this invention will now be described with reference to the accompanying drawing which constitutes a part of the present specification. In this drawing which illustrates practical embodiments of the invention:

Fig. 1 is a perspective view of a cassette in closed position;

Fig. 2 is a sectional view taken along the lines 2—2 of Fig. 1;

Fig. 3 is a sectional view of the valve and adjacent part of the cover taken along the lines 3—3 of Fig. 1;

Fig. 4 is a plan view of a ball-retaining ring showing the air-escape passages;

Fig. 5 is a cross section of a modified cassette having a sinuous support in the reservoir and an alternative sealing gasket; and Fig. 6 is a bottom plan view of a portion of the reservoir cover.

Referring now to the drawing wherein the same reference numerals refer to the same parts throughout the several views, the novel cassette consists of a shallow, rectangular frame 1 consisting of side walls and end walls and a narrow peripheral front wall 2 which supports a flexible or deflectable sheet 3 which constitutes the front of the cassette. If desired, the walls and sheet can be made in one piece. In the case of an X-ray cassette, which constitutes the preferred embodiment of this invention, this sheet is opaque to light rays yet transmits X-rays. Placed on top of the front sheet and around its entire periphery is a narrow gasket 4. This gasket is preferably wedge-shaped as shown by 4' in Fig. 5.

The back of the cassette or cover consists of a shallow, rectangular box comprising two parallel sheets 5 and 6, side walls 7 and end walls 8. The space between the two parallel sheets forms a vacuum reservoir 9. The side and end walls and the two parallel sheets may be affixed together in any desired manner by welding, soldering, etc. The bottom sheet of the cover is provided with a plurality of small holes 10 which communicate with the vacuum reservoir and the space below its outer surface. These holes are preferably regularly spaced so as to provide uniform pressures in the cassette and are connected by shallow grooves or channels 10' in a grid-like pattern as shown in Fig. 6. The bottom sheet is provided with a narrow gasket 11 which extends around its periphery.

The cover is made of slightly smaller dimensions than the inner dimensions of the frame so that it can be readily removed therefrom. The upper surface of gasket 4 or 4' in the frame contacts with the bottom surface of gasket 11 on the cover throughout a small peripheral area sufficient to form a light and air seal. These gaskets are preferably formed of a resilient material, e. g., rubber either natural or synthetic, or some form of elastomer which has good wearing properties.

The cover is provided with hinges 12 which merely consist of a flange which is screwed, welded or otherwise affixed to the outer sheet of the cover and have extended arm portions 13 which are provided with ball-shaped heads 14 which fit into a spherical recess 14' in the side walls of frame 2. Various other types of hinges can be used, if desired. The upper surface of the outer cover sheet is provided with spring clamps 15 which are pivoted at their centers on fastening members 16. The ends of the spring clamps fit into suitable slot recesses 17 in the side walls of the cassette.

The vacuum eduction valve device consists of a cylindrical chamber 18 which is provided with a tapered annular seat 19 near its central portion. The side walls of the cylindrical chamber are provided with a plurality of openings 20 which establish communication with the vacuum reservoir 9 and cylindrical chamber 18 above the annular valve seat. Communication between the chamber and a suitable vacuum eduction nozzle is obtained through hole 21 in the annular seat. Ball 22 closes the hole when a vacuum is established in reservoir 9. This ball is prevented from being removed from chamber 18 by means of an annular retaining ring 23 which fits into a suitable annular recess 24 in the walls of chamber 18 and has suitable openings or slots 23' for the passage of air. A manually actuated vacuum release pin 25 is provided in the chamber so that the ball can be forced from its seating position. This release pin, as shown, is adapted to slide in a cooperating recess 26 and has an extended nob portion 27 which can be grasped to actuate it.

In Fig. 2 there is shown an X-ray cassette, wherein the flexible front is impermeable to light, which is in loaded position for an exposure to X-rays. This cassette has an X-ray intensifying screen 28 mounted on the back surface of the front and in juxtaposition in order a double coated X-ray film 29 and another X-ray intensifying screen 30. The fluorescent surfaces of the screens, of course, face the light-sensitive surfaces of the film. The screens can be adhesively joined to the front sheet and cover member, if desired, so that they do not slip about in the body of the cassette. This can be accomplished by means of a narrow band of adhesive located near the outside edges of the screens. If desired, a thin sheet of lead can be placed between the grid and the screen.

The holes 10 in bottom sheet 6 of the cover are preferably regularly spaced to form a grid pattern. It is desirable to have rows of holes disposed between the sides of the film and juxtaposed screens and the gaskets, in order to more rapidly evacuate the space. The surface grooves 10' aid in the rapid evacuation of the space below the cover member. If desired, diagonal grooves can be used.

The frame and cover are preferably composed of a light-weight metal, e. g., aluminum or an aluminum alloy or a magnesium alloy but may be made of a suitable resin or plastic material which can be reinforced with fibers.

When the cover is made of cast metal and is provided with reinforcing ribs, the outer and inner surfaces will not bend or deflect inwardly due to air pressure. However, when the cover is made of stamped or pressed metal parts it is advisable to have supports placed between their inner surfaces to prevent collapse. In Fig. 2 suitable supports are shown as columns 31. In place of the columns straight or curved partition walls can be used. These partition walls should allow for free passage of air at their ends or through holes or cut-away portions. Another practical type of support is shown in Fig. 5. It consists of a sinuous corrugated sheet 32 which can be inserted between the two parallel sheets of the cover. The corrugated sheet may be of less width than the width of the reservoir, or it may be reticulated or provided with large holes or openings so that air will circulate freely throughout the reservoir. When made of metal, the edges of the lower points of the corrugations can be welded to the inner surface of the bottom sheet of the cover.

Various other types of sealing valves can be used in place of the particular check valve shown. Similarly, various types of hinges and locking devices can be used in place of those shown. In place of spring clamps, sliding bolts or rods can be used. In such case a suitable recess would be provided in the walls of the cassette. Various hooks or clasps can be used. Suitable other hinges and spring latch constructions are shown in Reuter U. S. Patent 2,590,891.

Since the X-ray intensifying screens are generally mounted on a flexible cardboard base and the photographic film or films to be exposed also are flexible, upon reducing the air pressure in vacuum reservoir 9 after loading the cassette, the screens and film or films are pulled into uniform tight engagement with each other and against the lower grid surface of the cover.

For use as an X-ray cassette the front member 3 can be made of any material which transmits X-rays but does not transmit light rays. It generally should be sufficiently thick so that it cannot be readily bent or ruptured during handling, but must not be so thick that it will not flex under atmospheric pressure when the reservoir 9 is evacuated. It may be composed of aluminum, magnesium or other metal, or synthetic resin or superpolymer or such materials which contain fibers in order to give greater strength. The front 3 may also be composed of a sheet of a fabric impregnated and coated with a resin or superpolymer, e. g., a phenol-formaldehyde resin. Suitable additional materials include hard rubber, pigmented or opaque plastics, e. g., tetrafluoroethylene; superpolyesters, e. g., polyethylene terephthalate; superpolyamides (nylon); vinyl resins, e. g., polyvinyl chloride, polyvinyl acetate; polyacrylic acid, e. g., polymerized methyl methacrylate, ethyl acrylate, etc.; polystyrene, etc.

By making front 3 of light-transmitting material, e. g., polyvinyl chloride, cellulose acetate, nylon, etc., the cassettes can be used as printing frames for pressing a negative transparency into contact with a light-sensitive film or paper element. In this case the cassettes would not contain an intensifying screen and would be loaded in a darkroom and exposed to light after inserting an evacuation or eduction nozzle in cylinder 18 and reducing the pressure in chamber 9 of the loaded, closed cassette.

In the case of a cassette having dimensions of 14 by 17 inches and a frame height of ¾ inch, a vacuum chamber of 26 to 65 cubic inches can be had. By connecting the eduction valve to a suitable vacuum pump nozzle, air pressures of 14 pounds per square inch and higher can be attained thus forcing flexible front 3 inwardly and forcing the screen or transparency light-sensitive element against the grid on the cover. This degree of vacuum can be retained for 20 to 30 minutes thus giving adequate time to expose the photographic film or paper.

The cassette of this invention is simple and effective. It can be readily operated by the ordinary technician after reading simple instructions. It is rugged and can be used for many years without any necessity for repairs or adjustments.

An additional advantage is that the cassette can be made to be light in weight. A further advantage is that the cassettes provide good and uniform contact between an X-ray intensifying screen or screens and the entire surface or surfaces of an X-ray film element thus insuring good detail over the entire picture and eliminating fuzzy details. Another advantage is that successive exposures result in uniform pictures. Still other advantages will be apparent from the above description.

The embodiments of the invention in which an exclusive property or privilege is claimed are defined as follows:

1. A cassette comprising a shallow rectangular tray having light-opaque side and end walls and a flexible front sheet that is permeable to radiation to which a photosensitive sheet is sensitive, said tray being adapted to receive a photo-sensitive sheet, an interfitting rectangular box cover having light-opaque side and end walls, a light opaque top sheet provided with an air eduction opening having a sealing valve therein, and a parallel bottom sheet spaced from said top sheet to provide a vacuum reservoir chamber therebetween, a plurality of small holes extending through said bottom sheet, a narrow sealing gasket on the bottom surface of said bottom sheet and extending along its sides and ends, a cooperating sealing gasket on the upper surface of said front sheet, and means for locking said cover in said tray.

2. A cassette comprising a shallow rectangular tray having light-opaque side and end walls and a flexible front sheet that is permeable to radiation to which a photo-sensitive sheet is sensitive, said tray being adapted to receive a photo-sensitive sheet, an interfitting rectangular box cover having light-opaque side and end walls, a light-opaque top sheet provided with an air eduction opening having a check valve therein, and a parallel bottom sheet spaced from said top sheet to provide a vacuum reservoir chamber therebetween, a plurality of small holes extending through said bottom sheet, a narrow sealing gasket on the bottom surface of said bottom sheet and extending along its sides and ends, a cooperating sealing gasket on the upper surface of said front sheet, and means for locking said cover in said tray.

3. A cassette comprising a shallow rectangular tray having light-opaque side and end walls and a flexible front sheet that is permeable to radiation to which a photosensitive sheet is sensitive, said tray being adapted to receive a photosensitive sheet, an interfitting hinged rectangular box cover having light-opaque side and end walls, a light-opaque top sheet provided with an air eduction opening having a sealing valve therein, and a parallel bottom sheet spaced from said top sheet to provide a vacuum reservoir chamber therebetween, a plurality of small holes extending through said bottom sheet, a narrow sealing gasket on the bottom surface of said bottom sheet and extending along its sides and ends, a cooperating sealing gasket on the upper surface of said front sheet, and spring clamps pivoted on said cover and cooperating recesses on said walls for locking said cover in said tray.

4. A cassette comprising a shallow rectangular tray having light-opaque side and end walls and a thin flexible front sheet impermeable to light-rays but permeable to X-rays, said tray being adapted to receive an X-ray-sensitive photographic film and an X-ray intensifying screen, an interfitting hinged rectangular box cover having light-opaque side and end walls, a light-opaque top sheet provided with an air eduction opening having a check valve therein, and a parallel bottom sheet spaced from said top sheet to provide a vacuum reservoir chamber therebetween, a plurality of small holes extending through said bottom sheet, a narrow sealing gasket on the bottom surface of said bottom sheet and extending along its sides and ends, a cooperating sealing gasket on the upper surface of said front sheet, and spring clamps pivoted on said cover and cooperating recesses on said walls for locking said cover in said tray.

5. A cassette as set forth in claim 4 wherein said check valve has an annular seat, a ball resting on said seat and is provided with a movable ball unseating pin.

6. A cassette as set forth in claim 4 wherein said spring clamps latch into grooves on the side walls of the said tray.

7. A cassette comprising a shallow rectangular tray having light-opaque side and end walls and a flexible front sheet that is permeable to radiation to which a photosensitive sheet is sensitive, said tray being adapted to receive a photosensitive sheet, an interfitting rectangular box cover having light-opaque side and end walls, a light-opaque top sheet provided with an air eduction opening having a sealing valve therein, and a parallel bottom sheet spaced from said top sheet to provide a vacuum reservoir chamber therebetween, a plurality of small holes extending through said bottom sheet, the outer surface of the latter sheet containing shallow grooves connecting with adjacent holes, a narrow sealing gasket on the bottom surface of said bottom sheet and extending along its sides and ends, a cooperating sealing gasket on the upper surface of said front sheet, and means for locking said cover in said tray.

8. A cassette as set forth in claim 7 wherein said grooves and holes have a grid-like pattern.

9. A cassette comprising a shallow rectangular tray having light-opaque side and end walls and a thin flexible front sheet impermeable to light-rays but permeable to X-rays, said tray being adapted to receive an X-ray-sensitive photographic film and an X-ray intensifying screen, an interfitting hinged rectangular box cover having light-opaque side and end walls, a light-opaque top sheet provided with an air eduction opening having a check valve therein, and a parallel bottom sheet spaced from said top sheet to provide a vacuum reservoir chamber therebetween, a plurality of small holes extending through said bottom sheet, the outer surface of the latter sheet containing shallow grooves connecting with adjacent holes to form a grid-like pattern, a narrow sealing gasket on the bottom surface of said bottom sheet and extending along its sides and ends, a cooperating sealing gasket on the upper surface of said front sheet, and spring clamps pivoted on said cover and cooperating recesses on said walls for locking said cover in said tray.

References Cited in the file of this patent

UNITED STATES PATENTS

| | | |
|---|---|---|
| 1,449,970 | Bucky | Mar. 27, 1923 |
| 1,550,499 | Buck | Aug. 18, 1925 |
| 2,371,843 | Powers | Mar. 20, 1945 |
| 2,600,064 | McCune | June 10, 1952 |